Inventors: William C. McConnell, Griffin, Ga.; Henry W. Rahn, Pittsburgh, Pa.

United States Patent [19]
McConnell et al.

[11] 3,771,994
[45] Nov. 13, 1973

[54] METHOD OF CONTROLLING WEEDS WITH A COMBINATION OF AN ORGANIC HERBICIDE AND POTASSIUM AZIDE

[75] Inventors: William C. McConnell, Griffin, Ga.; Henry W. Rahn, Pittsburgh, Pa.

[73] Assignee: PPG Industries, Inc., Pittsburgh, Pa.

[22] Filed: June 25, 1970

[21] Appl. No.: 49,995

Related U.S. Application Data

[60] Continuation of Ser. No. 645,069, is a division of Ser. No. 358,121, April 7, 1964, abandoned.

[52] U.S. Cl............................. 71/111, 71/83, 71/84, 71/110, 71/117
[51] Int. Cl................................................ A01n 9/20
[58] Field of Search....................... 71/65, 111, 110, 71/83, 84, 117

[56] References Cited
UNITED STATES PATENTS

| | | | |
|---|---|---|---|
| 1,819,399 | 8/1931 | Wesenberg........................ | 71/65 UX |
| 3,004,844 | 10/1961 | Stahler et al............................ | 71/83 |
| 3,342,577 | 9/1967 | Blouin et al. ..................... | 71/DIG. 1 |
| 3,366,539 | 1/1968 | Woodbury.............................. | 71/65 |

FOREIGN PATENTS OR APPLICATIONS

| | | | |
|---|---|---|---|
| 604,497 | 9/1960 | Canada............................ | 71/DIG. 1 |

OTHER PUBLICATIONS

Agronomy Abstracts, page 85, 1965
Colby et al., Weeds, Vol. 15 No. 2, pp. 163–167, April, 1967.

Primary Examiner—James O. Thomas, Jr.
Attorney—Chisholm and Spencer

[57] ABSTRACT

Potassium azide and an organic herbicide capable of being metabolized by micro-organisms in the soil are applied to the soil. The potassium azide kills the micro-organisms, thereby extending the soil life of the organic herbicide. Upon decomposition of the potassium azide, potassium and nitrogen values are provided to the soil. Isopropyl N-(3-chlorophenyl)-carbamate is illustrative of the organic herbicides which may be employed. A granule containing both the organic herbicide and the potassium azide which is suitable for application to the soil is described.

10 Claims, No Drawings

METHOD OF CONTROLLING WEEDS WITH A COMBINATION OF AN ORGANIC HERBICIDE AND POTASSIUM AXIDE

Cross-References to Related Applications

This application is a continuation of application Ser. No. 645,069, filed Feb. 10, 1967, which is a division of application Ser. No. 358,121, filed Apr. 7, 1964 both of which applications are now abandoned.

DISCLOSURE

This invention relates to potassium azide. More specifically, this invention relates to the use of potassium azide as an agricultural chemical.

According to this invention, potassium azide is utilized in combination with other chemical compounds to kill, deactivate or regulate the growth of organisms, e.g., plants, fungi, and soil micro-organisms, e.g., bacteria. Potassium azide is also used in accordance with this invention to provide plant nutrients to crop plants. Thus, in a preferred embodiment of this invention, a single application of potassium azide provides both pesticidal and fertilizing benefits to the soil.

A spray or dip of potassium azide on harvested fruit or vegetables is effective in inhibiting or preventing post-harvest deterioration. The deterioration inhibited by this treatment includes rot, typically caused by fungi and/or soil micro-organisms, e.g., bacteria, sprouting, budding, and the natural results of continued respiration or enzyme activity in the harvested plant product. Thus, for example, when a sugar beet is dipped in an aqueous solution containing about 1/10 to about 5 per cent potassium azide, the respiration of the sugar beets is inhibited. Because respiration of a sugar beet normally consumes sugar, the sugar content of a beet where respiration is thus inhibited is maintained at a high level. Within a relatively short period, rarely in excess of a week, the combination of the moisture on the surface of a sugar beet and the micro-organisms migrating from the air to the beet's surface effect the decomposition of the potassium azide on the beet so that the sugar beet is fit for human consumption. A similar treatment of potatoes retards the conversion of starch into undesirable sugar by substantially reducing the enzyme activity of the potato. Although the toxicity of potassium azide is dissipated when the potassium azide decomposes, the effect of the azide on the biological processes of the harvested plant parts usually extends beyond the life of the azide. Often these effects are permanent.

Potassium azide is frequently advantageously applied in combination with other herbicides, nematocides, defoliants, fungicides, bactericides, and similar pesticides. Potassium azide increases and extends the activity of the other pesticides by deactivation of the soil organisms that decompose (typically by metabolizing) the pesticides. Frequently the combination of potassium azide with one or more other herbicides is synergistic in effect. Thus, a broader spectrum of undesirable organisms is effected by the combination than by either the potassium azide, or the other pesticide alone. The effectiveness of the combination against a particular undesirable organism is often greater than the sum of the effect of the individual components. The preparation of azide in the combination may range from less than 1 per cent to in excess of 90 per cent. Recommended proportions are about 1 to about 30, typically less than 20, rarely more than 70 per cent by weight, basis the combination. The most advantageous proportion to use often is determined by economic considerations.

In addition to its many other desirable properties, potassium azide is an excellent cytochrome oxidase inhibitor. Thus, potassium azide inhibits the activity of soil micro-organisms which normally attack and break down pesticides. By introducing potassium azide to the soil along with the pesticides which are susceptible to these micro-organisms the "soil lives" of the pesticides (i.e., the duration of effectiveness in the soil) are greatly extended. The proportion of azide added with the pesticide depends on the nature of the particular pesticide and the extent of soil-life extension desired. Equal weights of azide and pesticide have provided excellent results. Other proportions are within contemplation. Typically at least about 5 per cent by weight, rarely in excess of 90 per cent by weight, basis the pesticide and azide, potassium azide is employed with the pesticide. Important herbicides of known short soil life due to micro-organism attach include 2,4-dichlorophenoxyacetic acid and its esters, 4(2,4-dichlorophenoxy)butyric acid and its esters, 2-methyl, 4-chlorophenoxyacetic acid and its esters, 4-(2-methyl-4-chlorophenoxy)-butyric acid and its esters, 2-2-dichloropropionic acid and its salts, trichloroacetic acid and its salts, dinitrobutylphenol, dinitro-orthocresol, allyl alcohol, isopropyl N-phenylcarbamate, isopropyl N-(3-chlorophenyl)-carbamate, secondary butyl N-(3-chlorophenyl)carbamate, ethyl N,N-di n-propylthiolcarbamate, propylethyl N-n-butylthiol-carbamate, 2-chloroallyldiethyldithiocarbamate, secondary butylphenoldisodium salt of 3,6-endoxohexahydrophthalic acid, 2-chloro N,N-diallylacetamide, N-arylphthalamic acid and its esters and salts, and aminotriazole.

Due to the relatively short soil life of potassium azide, its benefits in extending the soil lives of pesticides are prolonged when it is applied in protective carriers such as granules, pellets or capsules. The soil life of potassium azide is significantly extended when it is incorporated in e.g., granules of highly calcined clay such as attapulgite clay or other materials resistant to physical deterioration by the soil. Other materials which can be granulated to provide suitable granules for this embodiment include corn cobs, vermiculite, natural manures, woodflour, sawdust or shavings, and plant stems, stalks or leaves. Usually, the pesticide is incorporated in the granule along with potassium azide. It is often of particular benefit to coat the granules containing potassium azide (either alone or in combination with other pesticides) with a semi-permeable film or shell. An example of the granule contemplated by this embodiment is a 15/30 mesh attapulgite clay granule impregnated with isopropyl N-(3-chloro-phenyl)carbamate and potassium azide and coated with a thin film of polymerized drying oil. The film on the granule allows only slow vaporization of the carbamate from the granule. In addition, the film allows minimal contact of the soil micro-organisms with the carbamate and azide in the granule. The potassium azide in the granule deactivates organisms penetrating the film before they can metabolize the carbamate. Of course, eventually all of the carbamate vaporizes and escapes from the granule or the pellet. Soil micro-organisms and moisture penetrating the film eventually decompose the potassium azide in the granule. Thus after serving the function of guarding the pesticide in the pellet from attack by soil organisms, the azide provides plant nutrients to the soil. The semi-impervious film around the granule can be any suitable material which physically allows a slow release of pesticide, e.g., carbamate vapors. Various acrylic resins, e.g., polymethyl methacrylate, vinyl resins, e.g., polyvinylacetate, and drying oils, e.g., linseed oil, soybean oil, safflower oil, castor oil, tung oil, and fish oils are useful for this purpose. These drying oils are often semi-oxidized when they are applied to the granule. Of course, any particular coating material performs best with particular pesticides. The rate of vapor escape from the pellet can be altered within wide limits by choosing appropriate coatings and by applying appropriate quantities thereof to the granule. The soil life of isopropyl N-(3-chlorophenyl)carbamate has been extended several months in this fashion.

Frequently pesticides decompose into products which are detrimental to plant life, particularly crop plants. An outstanding characteristic of potassium azide is its property, unlike other water soluble azides, e.g., sodium azide, of converting from extremely active pesticide to products which are not only harmless to but significantly beneficial to plant life. As potassium azide remains in contact with the soil, it is decomposed by microbial and chemical agents in the soil to form potassium and nigrogen-containing products. These products are available as plant food and do not possess the biological toxicity of potassium azide. Thus in a preferred embodiment of this invention, potassium azide is applied to the soil to cleanse the soil of undesirable organisms. Seeds are then planted. The seeds are planted prior to re-establishment of the undesirable organisms in the soil, but subsequent to the decomposition of potassium azide into plant food.

The time interval allowed to elapse after application of potassium azide but prior to planting depends on the amount of potassium azide applied, soil type, moisture, temperature and other conditions of the soil. A single application of potassium azide not only clears the planting area of undesirable plant life, seeds, fungi, nematodes, etc., but serves as an excellent fertilizer for newly planted seeds. It is usually safe to plant most crop seeds or seedlings about 1 week to 1 month after application of up to 500 pounds per acre or more of potassium azide. At lower application rates, for example, about 20 to about 100 pounds per acre, planting can be done even sooner, for example, about 3 to about 10 days.

It is within the contemplation of this invention that potassium azide be applied to the soil in a blend with other herbicides and fertilizers. In particular, potassium azide is advantageously included in mixed fertilizers. In such a blend, potassium azide not only upgrades the fertilizer but also contributes pesticidal activity to the blend. A mixed fertilizer typically comprises a blend of several chemical compounds, usually inorganic compounds although organic substances such as urea, activated sludge, manures, etc., are sometimes included. Each compound in the blend usually contributes one or more primary plant nutrients. The three primary plant nutrients are nitrogen (N), phosphate ($p_2O_5$), and potash ($K_2O$). Commercial mixed fertilizers are customarily designated by three numbers which indicate, in order, the weight percentage of N, $P_2O_5$ and $K_2O$ respectively supplied by the blend. For example, a 6-12-12 mixed fertilizer contains at least 6 per cent nitrogen, 12 per cent phosphate equivalent and 12 per cent potash equivalent. Compounds which contain phosphorus and potassium are always reported in terms of $P_2O_5$ and $K_2O$ equivalent, respectively. because it is in this form that the phosphorus and potassium are useful to plants. Individual chemical compounds are designated in the same manner. Thus, for example, ammonium nitrate which contains 33.5 per cent available nitrogen may be designated 33-0-0. High-grade potassium chloride may be designated 0-0-62 to indicate that it contains at least 62 per cent by weight $K_2O$ equivalent. On this same scale, substantially pure potassium azide is rated 51-0-58. Thus, potassium azide is particularly rich in primary plant nutrients. One pound of potassium azide blended in a mixed fertilizer contributes more than a pound of plant food equivalent to the mix. The Fertilizer Handbook (Second Edition, 1963) published by the National Plant Food Institute, 1700 K Street, N.W., Washington 6, D. C., which is, insofar as it is applicable hereto incorporated by reference herein, describes in detail in chapter 4 thereof the preparation and components of typical mixed fertilizers. Chapter 8 of the Handbook contains a plurality of tables which provide a convenient means of determining the weights of fertilizing material which is equivalent in plant food content to a specified weight of another material. By following the principles outlined in the Handbook, in particular chapters 4 and 8, one skilled in agriculture can easily utilize potassium azide in the preparation of a mixed fertilizer of any desired plant food composition.

Potassium azide is very soluble in water. Thirty-one per cent potassium azide by weight, basis the solution, may be dissolved in water at 10°C. At 40°C. solutions containing up to 50 per cent by weight potassium azide, basis the solution, are conveniently prepared. Potassium azide solutions may be stored and used in vessels of mild steel, stainless steel, and or nickel, for example, for time periods normally required in agricultural practice without significant reaction between the azide solution and the material of the container. Thus in all of the embodiments described herein potassium azide is often conveniently applied, as spray or dip to seeds, plants or soil in aqueous solution. Other methods of application are within the scope of this invention. Potassium azide may also be applied to soil, packages, or directly to plants in the form of, e.g., crystals, granules, or finely comminuted dry dust. It is sometimes convenient to mix solid potassium azide with a wettable powder of water insoluble pesticide, e.g., 2,4-dichlorophenoxyacetic acid. The mixture, containing from less than 1 to in excess of 90 per cent by weight azide is then conveniently mixed in aqueous media prior to application.

In aqueous solution, it is often convenient to dissolve along with the potassium azide other water-soluble pesticides or fertilizers. It is customary practice to apply sprays to crops in the form of aqueous solutions or dispersions. Thus, pesticides in organic solution or dispersion are conveniently mixed with aqueous solutions of azide to form an emulsion or suspension. The mixture is then sprayed, sometimes while being agitated to prevent the aqueous and inorganic phases from separating. Alternatively, the aqueous solution of potassium azide, with or without other active ingredients in solution is sprayed either before or after other pesticides or fertilizers are applied. Powdered or crystalline potassium azide in combination with wettable powders of other pesticides is preferably mixed in aqueous media immediately before spraying. Upon agitation, the potassium azide dissolves in the aqueous media while the water insoluble powders are suspended therein. Usually, sufficient aqueous medium, typically tap water, is employed that the solution contains less than 25, normally about 1 to about 10 per cent by weight potassium azide.

When it is desired to dust crop plants with dry dust, the potassium azide may be ground to very fine powder size, usually minus 100 mesh. It is usually desirable to dilute the azide with inert solid diluent such as silica, clay, talc, bentonite, diatomaceous earth, woodflour, etc. Good distribution of the azide is usually facilitated by diluting the azide with up to in excess of 99 per cent inert dust. Sometimes formulations containing about 5 to about 25, rarely in excess of 30 per cent azide are useful. Another effective method of diluting potassium azide for solid application is to supply the potassium azide as an absorbed ingredient or coating on granules of inert material, for example, attapulgite clay, corn cob, sawdust, bentonite, etc. The azide may also be absorbed or coated on other pesticides, pesticide-containing granules, or fertilizers, especially natural fertilizers such as manures, activated sludge, etc. Potassium azide is usually present in these granules, etc., in amounts of less than about 25 per cent by weight, basis the granule including all absorbed constituents, although much greater proportions are possible and within contemplation. The potassium azide content of these granular products typically ranges from about 1 per cent to about 20 per cent, most often about 2 per cent to about 10 per cent.

When the azide is applied to the soil in crystal, granular or other solid forms, it is sometimes allowed to lie on the soil, exposed to normal weather conditions. It is more often watered into the soil. It is frequently harrowed or plowed into the earth. In general, potassium azide may, because of its very flexible properties, be applied to the soil by any known technique commonly used in the application of presently available fertilizers and/or pesticides.

The following examples illustrate the manner in which the invention may be practiced:

EXAMPLE I

15/30 mesh attapulgite granules were sprayed while being agitated in a rotary blender with molten CIPC (isopropyl N-(3-chlorophenyl)carbamate) to produce 20 per cent by weight CIPC granules, basis the granules.

Stocks of these granules were coated with 1 per cent and 10 per cent respectively potassium azide by soaking the granules in 50 per cent by weight, basis the solution, aqueous potassium azide solution. Each granule composition was applied to 160 grams of soil, contained in waxed paper cups at a rate equivalent to 8 pounds of CIPC (active) per acre. Each test cup had 7.07 square inches of soil surface. The cups were maintained at 88 to 92° relative humidity at temperatures during the day (light on at 4 a.m., light off at 8 p.m.) of 90° to 93°F. The temperature during the "lights off" period was maintained at about 70°F. Samples of soil were taken and analyzed to determine per cent CIPC loss. The results of this analysis is reported in Table 1.

TABLE 1

| | Percent CIPC Loss | | | |
|---|---|---|---|---|
| Days of Exposure | 0 | 7 | 14 | 28 |
| CIPC granules No coating | 0 | 31 | 60 | 97 |
| 1% KN$_3$ coated CIPC granules | 0 | 28 | 51 | 71 |
| 10% KN$_3$ coated CIPC granules | 0 | 29 | 53 | 74 |

EXAMPLE II

Table 2 lists a variety of weed and crop seeds planted in marked rows in a medium clay loam garden soil. The seeds were planted 1/2 to 3/4 inches deep. Plastic sheet strips were spread on the ground to maintain sharply defined areas of treatment. Granules of the formulations listed in the table were applied by hand from a shaker can in weighed amounts at the rate of 5 pounds of herbicide per acre. The 20 per cent CIPC-10 per cent KN$_3$ and the 20 per cent CIPC formulations were identical to those used in Example I. The 10 per cent 2,4-D-10 per cent CIPC granules were prepared by spraying a molten mixture of 99 per cent technical CIPC and technical 2-ethylhexyl ester of 2,4-dichlorophenoxyacetic acid onto 15/30 mesh attapulgite granules in the same fashion as CIPC granules of Example I were prepared. Table 2 reports the herbicidal effectiveness of the formulations on a scale wherein 1 represents no effect and 10 represents 100 per cent kill.

TABLE 4

| | 20% CIPC-10% KN$_3$ | 20% CIPC | 10% 2,4-D 10% CIPC |
|---|---|---|---|
| Bush Bean | 6 | 2 | 10 |
| Cotton | 1 | 1 | 10 |
| Tomato | 5 | 3 | 10 |
| Carrot | 10 | 3 | 10 |
| Corn | 5 | 5 | 5 |
| Ragweed | 6 | 9 | 9 |
| Barnyard Grass | 8 | 1 | 10 |
| Pigweed - Planted | 7 | 1 | 10 |
| Pigweed - Volunteer | 10 | 10 | 10 |
| Crabgrass - Planted | 7 | 5 | 9 |
| Crabgrass - Volunteer | 10 | 5 | 10 |
| Velvet Leaf | 10 | 9 | 10 |
| Foxtail | 7 | 7 | 7 |
| Buckhorn Plantain | 8 | 10 | 10 |
| Mustard | 10 | 10 | 10 |

Although the instant invention has been described with particular reference to certain specific embodiments and examples, it is not intended thereby to limit the scope of this invention except insofar as specific limitations are recited in the appended claims.

We claim:

1. In the method of controlling weeds by applying to the soil an herbicidal amount of an organic herbicide capable of being metabolized by micro-organisms in the soil, said organic herbicide being selected from the group consisting of isopropyl N-phenylcarbamate, isopropyl N-(3-chlorophenyl) carbamate, 2,4-dichlorophenoxyacetic acid and esters of 2,4-dichlorophenoxyacetic acid, the improvement comprising applying to the soil an amount of potassium azide sufficient to kill said micro-organism, thereby both extending the soil life of said organic herbicide; and, upon decomposition of the potassium azide, providing nitrogen and potassium values to said soil.

2. The method of claim 1 wherein said organic herbicide is isopropyl N-phenylcarbamate.

3. The method of claim 1 wherein said organic herbicide is isopropyl N-(3-chlorophenyl)carbamate.

4. The method of claim 1 wherein said organic herbicide is selected from the group consisting of 2,4-dichlorophenoxyacetic acid and its esters.

5. The method of claim 1 wherein the amount of said potassium azide applied to said soil is in the range of from about 5 to 90 per cent by weight, basis the organic herbicide and potassium azide applied to said soil.

6. The method of claim 1 wherein the amount of said potassium azide applied to said soil is in the range of from about 1 to about 30 per cent by weight, basis the organic herbicide and potassium azide applied to said soil.

7. The method of claim 1 wherein said potassium azide is applied to said soil in the form of a granule comprising potassium azide and a material resistant to physical deterioration by the soil.

8. The method of claim 7 wherein said material resistant to physical deterioration by the soil is attapulgite clay.

9. The method of claim 8 wherein said organic herbicide is isopropyl N-(3-chlorophenyl)carbamate.

10. The method of claim 9 wherein said attapulgite clay is impregnated with said isopropyl N-(3-chlorophenyl)-carbamate and said potassium azide and coated with a thin film of polymerized drying oil.

* * * * *